United States Patent [19]

Anderson et al.

[11] Patent Number: 4,932,687
[45] Date of Patent: Jun. 12, 1990

[54] FLEXIBLE FLUID TRANSFER FITTING WITH ZERO REACTIVE FORCE

[75] Inventors: William K. Anderson, Rockford; Merle L. Bennett, Cherry Valley, both of Ill.

[73] Assignee: Sundstrand Corporation, Rockford, Ill.

[21] Appl. No.: 326,928

[22] Filed: Mar. 21, 1989

[51] Int. Cl.⁵ .............................. F16L 55/07
[52] U.S. Cl. ..................... 285/41; 285/299; 285/228; 285/229
[58] Field of Search ............ 285/41, 190, 299, 302, 285/226, 227, 224, 228, 229

[56] References Cited

U.S. PATENT DOCUMENTS

| | | | |
|---|---|---|---|
| 2,355,440 | 8/1944 | Howard | 285/228 |
| 3,061,039 | 10/1962 | Peters . | |
| 3,194,589 | 7/1965 | Kahlbau et al. . | |
| 3,198,558 | 8/1965 | Braden | 285/228 |
| 3,241,868 | 3/1966 | Soderberg . | |
| 3,359,016 | 12/1967 | Sarlls | 285/228 |
| 3,488,949 | 1/1970 | Jackson . | |
| 3,874,708 | 4/1975 | Gresens | 285/226 X |
| 4,239,267 | 12/1980 | Hudson | 285/228 |
| 4,647,163 | 3/1987 | Fuschetto | 285/226 X |

FOREIGN PATENT DOCUMENTS

| | | | |
|---|---|---|---|
| 0637319 | 3/1962 | Italy | 285/261 |
| 1200833 | 8/1970 | United Kingdom | 285/228 |
| 1424028 | 2/1976 | United Kingdom | 285/226 |

Primary Examiner—Randolph A. Reese
Assistant Examiner—Carol I. Bordas
Attorney, Agent, or Firm—Antonelli, Terry, Stout & Kraus

[57] ABSTRACT

A fitting that is adapted for use between two adjacent frame members that are mechanically isolated from one another. The fitting has two flanged members one fixed to each frame member and a pressurized liquid coolant flow channel with a pair of bellows units on opposite sides of an intermediate ring that is loosely mounted on the outer surface of a spool attached to one member.

11 Claims, 2 Drawing Sheets

FLEXIBLE FLUID TRANSFER FITTING WITH ZERO REACTIVE FORCE

DESCRIPTION

1. Technical Field

This invention relates to a fitting or connecting device for use in conjunction with equipment which must be isolated from vibration and liquid cooled by a high pressure liquid cooling system.

2. Background Art

Certain types of equipment such as inverters that are used for changing direct current to alternating current must be supported on an isolation mounted frame within a rigid mounted frame. In order to cool the electronics on an isolation or auxiliary frame, a fitting is required to transfer high pressure cooling liquid to the auxiliary frame without imposing a reactive force on the isolation frame mounts. It is not enough merely to provide a flexible hose between the rigid frame and the isolation or auxiliary frame because if the pressure or velocity of the liquid coolant changes, a reactive force analogous to a water hammer force, may be transferred to the isolation frame thereby decreasing the effectiveness of the isolation mounts.

The use of a pressure balanced coupling or fitting in piping systems for absorbing vibratory movement due to pressure changes is illustrated in a number of prior art patents including U.S. Pat. Nos. 2,355,440 granted Aug. 8, 1944; 3,198,558 granted Aug. 3, 1965; 3,359,016 granted Dec. 19, 1967; 3,874,708 granted Apr. 1, 1975; 4,239,267 granted Dec. 16, 1980 and 4,647,163 granted Mar. 3, 1987. The structures there disclosed do not have the capabilities and physical characteristics that make them suitable for use in certain applications.

DISCLOSURE OF INVENTION

It is an object of the present invention to provide a novel fitting for use with a vibration isolated frame as part of a conduit for transmission of a fluid coolant to the isolation mounted frame in a high pressure liquid cooling system.

It is a further object of the invention to provide a novel spool and intermediate ring that is attached to one end of each of two bellows units and which has sufficient clearance from the spool member to accommodate the amplitude of mechanical vibration movement normally encountered, with the bellows units being so arranged that with pressure or velocity of fluid coolant changes, the resulting reactive force is reduced essentially to zero.

Yet another object is to provide a novel fitting having an intermediate ring slidably mounted on a spool between two bellows units where the flow inlet opening and the flow outlet opening are positioned either at 90T with respect to each other or in a coaxial alignment.

These and other objects of the invention will become more fully apparent from the claims, and from the description as it proceeds in conjunction with the accompanying drawings.

BEST MODE FOR CARRYING OUT THE INVENTION

Figure 1:
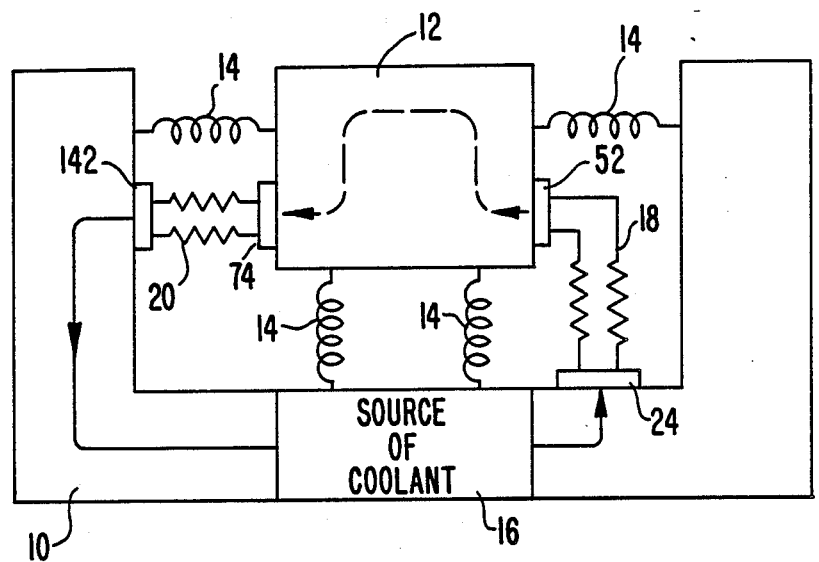
FIG. 1 is a schematic diagram showing a main frame and an auxiliary frame mechanically isolated from the main frame together with fittings for circulation of coolant.

Referring now to FIG. 1, a main frame 10 for a vehicle or the like is shown to support an auxiliary frame 12 which may be used to carry an inverter or other electronic equipment containing fragile components that require cooling and mechanical isolation against vibration from said main frame. Four springs 14 have been shown diagrammatically to illustrate isolation mounts so that frame 12 is totally isolated from the rigid mounted frame 10 which is shown to carry a source of pressurized coolant 16. In order to cool electronics mounted on the auxiliary frame 12, fittings 18 and 20 are needed to transfer a cooling fluid to and from the auxiliary frame without imposing a reactive force on the isolation mounts, notwithstanding the creation of pressure or velocity changes in the coolant flow.

Figure 2:
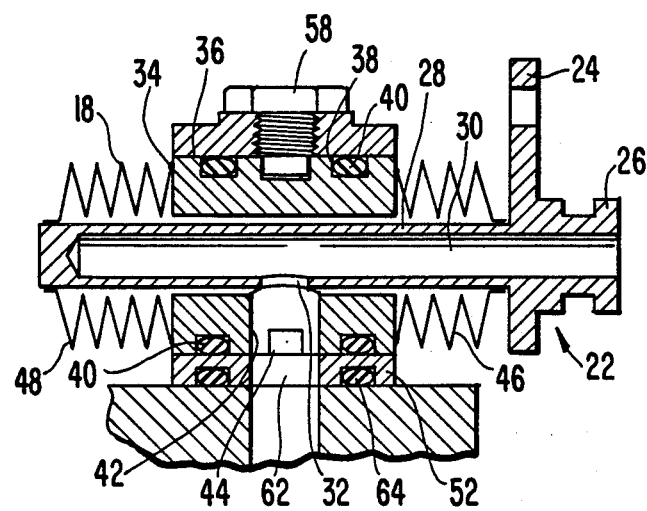
FIG. 2 is an elevation in section of one of the fittings shown in FIG. 1.
Figure 3:
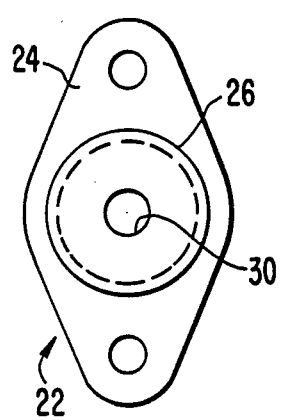
FIG. 3 is a right end view of the fitting of FIG. 2.
Figure 4:
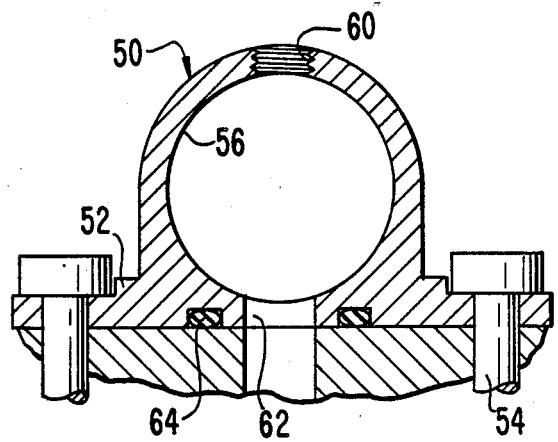
FIG. 4 is a left end view of the fitting of FIG. 2.

Fitting 18 is shown in FIGS. 2-4. A flanged spool 22 is formed of a body having a mounting flange 24 and a flow inlet or discharge hub 26. Spool 22 has a stem 28 having a uniform outer diameter which is formed with a central blind bore having an interior surface 30. A radially extending bore 32 passes through the stem wall at a central position along the length of stem 30.

An intermediate ring 34 has an outer cylindrical surface 36 which contains two circumferentially disposed grooves 38 each containing a radial squeeze O-ring 40. The intermediate ring 34 has an open interior which loosely fits on the stem 28. A radially extending bore 42 is provided through the wall of intermediate ring 34 and is positioned to be in substantial alignment with the radial bore 32 through the stem wall. Intermediate ring 34 may be formed with an additional central groove 44 which can be used for securement as will be explained below.

A first bellows unit 46 has inner and outer diameter with one end of the outer diameter sealingly secured as by welding, at one side face of the intermediate ring 34. An inner diameter at its other end similarly secured to the stem 28 which serves as the body of the spool 22. A second similar bellows unit 48 also has one end sealingly secured as by welding to the other side face of the intermediate ring 34 and its other end similarly secured to the distal end of the stem 28.

The chambers defined by the two bellows units 46, 48 are interconnected by a channel which may merely be the clearance between the inner wall of the bore of the intermediate ring 34 and the outer wall surface of the stem 28.

Referring now also to FIG. 4, the housing 50 is provided with a flange 52 and a suitable number of fasteners 54 for securement to the auxiliary frame 12 as shown in FIG. 1. The inner walls 56 forming the central aperture are slidable over the outer cylindrical surface 36 of the intermediate ring 34 as illustrated in FIG. 2. The fastener 58 is threadedly received in a threaded opening 60 of the housing 50 and has a nose portion which engages the central groove 44 of the intermediate ring 34. The opening 62, which serves as a fluid passageway to or from the auxiliary frame 12, may be made leakproof by providing a face seal such as by an axial squeeze O-ring 64.

Because the bellows units 46, 48 are located on opposite sides of the central port provided by radial bore 42 in stem 28, the hydraulic pressure of a liquid coolant acts equally on both bellows units and the external reaction forces between frames 10 and 12 are equal to thereby avoid the transfer of vibrations or displacement forces due to fluctuations in the coolant pressure. The intermediate ring 34 disposed between the two bellows units 46, 48 ties these forces together so that the effect is essentially neutralized.

Figure 5:
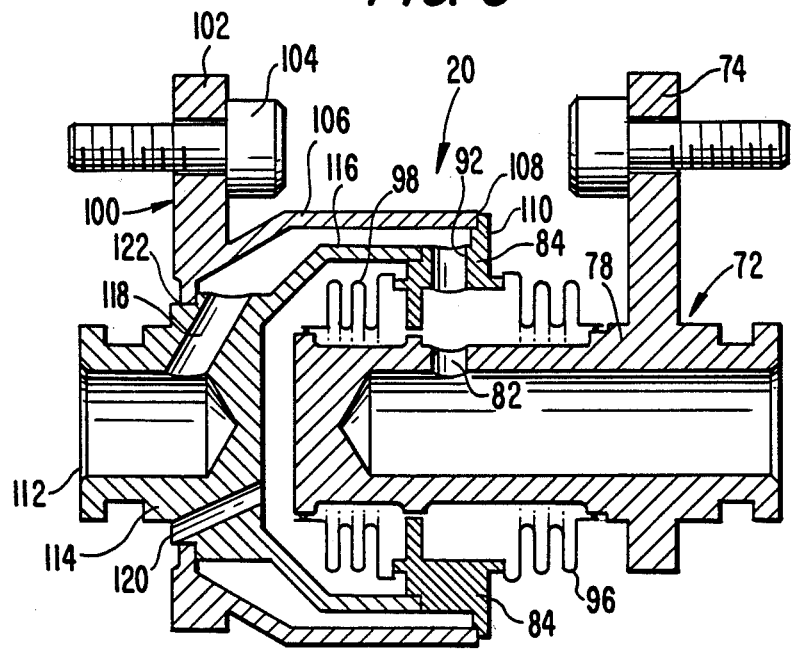
FIG. 5 is an elevation in section of the other fitting shown in FIG. 1 wherein the coolant inflow and outflow ports are in axial alignment.

For assembly, the intermediate ring 34 is sealingly secured to one end of each of the bellows units 46, 48 and slid over the end of the stem 28 of the spool member 22. The free ends of the bellows units 46, 48 are sealingly secured at opposite, ends of the spool stem 28 so that the radial bore 30 in the intermediate ring 34 is in substantial axial alignment with the radial bore 32 in the side wall of the spool stem 28. This assembly is then placed within the housing shown in FIG. 4 by sliding the outer diameter of the intermediate ring 34 along the inner surface 56 of the housing. Rotation of the housing 50 relative to the intermediate ring 34 allows a substantial alignment between radial bore 42 in the intermediate ring 34 and the fluid opening 62 in the housing 50. This position may be secured by use of the retainer screw 58 to allow easy disassembly. Leakage is prevented by use of axial squeeze O-rings 64 at the face seal and by radial squeeze O-rings 40 between the intermediate ring 34 and the inner surface 56 of housing 50.

Where a requirement is for a fitting having an input fluid opening and an output fluid opening to be in substantial axial alignment, the fitting may be modified as shown in FIG. 5. The spool 72 may be essentially the same as the spool 22 shown in FIGS. 2 and 3 and include a stem 78 with a central blind bore and a radial bore 82 through the stem side wall. The intermediate ring 84 is shown in FIG. 5 to be connected to one end of each of the bellows units 96, 98. The other ends of the bellows units 96, 98 are connected to opposite ends of the stem 78 to thus provide two chambers which can neutralize the effects of varying pressure drops across the fitting.

The intermediate ring 84 has a central bore which allows sliding movement along the outer surface of the stem 78 and a radial bore 92 in substantial axial alignment with the radial bore 82 of the stem 78.

The securement of the housing 100 to a frame may be by way of flange 102 and a suitable number of fasteners 104. The housing has an outer shell 106 which surrounds and extends over the entire length of the intermediate ring 84. Skirt 106 is sealingly secured as by welding around the end wall 110 of ring 84 which faces or is nearest to the mounting flange on spool 72.

The outlet fluid opening 112 of the housing 100 shown in FIG. 5 is formed as part of an inner shell 114 which has a cylindrical wall or skirt 116 that surrounds the distal end of stem 88 and bellows unit 98. One end of the inner shell skirt 116 is sealingly secured to the end wall of the intermediate flange 84 facing outlet fluid opening 112. The other end of the inner shell 114 is secured to the housing 100 as by a circumferential weld 122. An annular flow channel is therefore provided between the outer wall of the inner shell 114 and the inner wall of the outer shell 106. One or more slant bores 118 connect the annular flow channel to the fluid opening 112. The inner shell 114 is also provided with a bore 120 which serves as a vent to allow equalization of ambient pressure on the bellows units 96, 98 which is important for aircraft or space applications.

In the embodiment of FIG. 5, one end of each of the bellows units 96, 98 is secured to opposite ends of the intermediate ring 84. The other end of each of the bellows units 96, 98 is secured at opposite ends of the spool stem 78 with the radial bores in substantial alignment after the intermediate ring 84 is slid along the spool stem 78. The inner shell 114 is then secured to the end of the intermediate ring 84. Thereafter, the outer housing shell 100 is slid into position to allow the sealing securement to be made to a profile portion of end wall 110 of the intermediate ring 84. Finally, the inner surface of the housing 100 welded to the outer surface of the inner shell 114 along the circumferential line indicated at 122.

While two embodiments have been illustrated, it is apparent that other alternatives can be provided. All changes and equivalents which fall within the scope of the appended claims are intended to be covered hereby.

We claim:

1. A fitting for use with a liquid coolant which is circulated between two adjacent frames that are mechanically isolated from one another to allow independent vibration movement relative to each other, said fitting comprising:

a first member having means for rigid connection to one of said frames for receiving coolant inflow along a first flow direction;

a second member having means for rigid connection to the other of said frames for conducting coolant outflow along a second flow direction;

one of said members having a hollow elongated spool stem which has an outer diameter and a longitudinal closed bore, the outer diameter at the closed end of the spool stem being no larger than the diameter at a central portion, said one member being supported by said connection means with at least one coolant flow aperture radially disposed between said closed bore and an exterior surface of said spool stem at said central position along the length of said spool stem;

an intermediate ring having an exterior surface having a first diameter and an interior surface which has a second smaller diameter that is larger than the outer diameter of said spool stem thereby to loosely surround the exterior surface of said spool stem with sufficient space provided to allow bi-directional coolant flow along said space and relative movement between said ring and said spool;

said ring further having at least one radially disposed flow aperture in general alignment with said spool stem aperture;

a housing associated with the other of said members providing a coolant flow channel which extends to be in fluid communication with the radially disposed flow aperture at the exterior surface of said intermediate ring; and a pair of bellow members having inner and outer diameters with the inner diameter being substantially equal to the outer diameter of the spool stem central portion and the outer diameter being no greater than the intermediate ring exterior surface diameter;

each of said bellow members being secured at an outer diameter portion of one end to opposite end walls of said intermediate ring and secured at an inner diameter portion of their opposite ends to the exterior surface of said spool stem to form a pair of chambers on opposite sides of said intermediate ring whereby coolant flow is provided between said first and second members along a path which extends axially along said spool stem, radially through walls of said spool stem and said intermediate ring to said housing with coolant pressure pulses being directed to said chambers inside each of said bellow members in opposite directions to provide a reactive force that is substantially zero.

2. A fitting as defined in claim 1 wherein the flow direction of coolant to said first member is coaxial with the coolant flow path along said stem and the flow direction of coolant from said second member is coaxial with the flow direction through the walls of said spool stem and said intermediate ring, and said housing has an inner cylindrical wall that is slidable over the closed end of the stem, one of said bellow units and the intermediate ring exterior surface, there being axial squeeze O-rings on opposite sides of the flow aperture in said ring to prevent fluid leakage from between the intermediate ring exterior surface and the inner cylindrical wall of the housing.

3. A fitting as defined in claim 1 wherein the flow direction of coolant to said first member is coaxial with the flow direction of coolant from said second member, and said housing has an outer shell and inner shell, said outer shell having a cylindrical wall which extends over the closed end of the stem, one of said bellow units and the intermediate ring exterior surface and is sealingly and mechanically secured to said intermediate ring exterior surface; said inner shell having a cylindrical wall which is spaced inwardly of said outer cylindrical wall to form the flow channel in said housing and which has a uniform diameter along a length ending at an end portion that is sized to pass over the closed end of the stem, said one bellow unit and one of the faces of the intermediate ring; and the open end of said inner shell cylindrical wall is sealingly and mechanically secured to the intermediate ring member radially outwardly of the seal between the bellow unit and the end face.

4. Apparatus including a first frame having a pressurized supply of coolant liquid;
a second auxiliary frame supported on said first frame in a manner to be isolated from a vibrational standpoint;
a pair of fittings for circulating liquid coolant from said supply source to items to be cooled on said auxiliary frame;
each of said fittings comprising:
a first member having means including a flange for rigid connection to one of said frames for receiving coolant inflow along a first flow direction;
a second member having means including a flange for rigid connection to the other of said frames for conducting coolant outflow along a second flow direction;
one of said members having a hollow elongated spool stem which has an outer diameter of uniform size and a longitudinal closed bore, said one member being supported by said rigid connection means with at least one flow aperture radially disposed between said closed bore and an exterior surface of said spool stem at a central position along the length of said spool stem;
an intermediate ring having an exterior surface having a diameter and an interior surface which has an inner diameter that is larger than the outer diameter of said spool thereby to allow assembly over the closed bore end of said spool and to loosely surround the exterior surface of said spool with sufficient space provided to allow bidirectional coolant flow along said space and relative movement between said ring and said spool;
said ring further having at least one radially disposed flow aperture in general alignment with said spool stem flow aperture and between opposite end walls;
a housing associated with the other of said members providing a coolant flow channel extending from an exterior surface of said intermediate ring to one of said frames;
a pair of bellows members having inner and outer diameters with the inner diameter being substantially equal to the outer diameter of the spool stem and the outer diameter being no greater than the intermediate ring exterior surface diameter;
each of said bellow members being secured at an outer diameter portion of one end to the opposite end walls of said intermediate ring and secured at an inner diameter portion of their opposite ends to the exterior surface of said spool stem to form a pair of chambers on opposite sides of said intermediate ring whereby coolant flow is provided between said first and second members along a path which extends axially along said spool stem, radially through walls of said spool stem and said intermediate ring with coolant pressure pulses being directed to said chambers inside each of said bellow members in opposite directions to provide a reactive force that is substantially zero; and
wherein in one of said fittings, the flow direction of coolant to said first member is coaxial with the flow direction of coolant from said second member, and
in the other of said fittings, the flow direction of coolant to said first member is coaxial with a coolant flow path along said stem and the flow direction of coolant from said second member is coaxial with a flow direction through the walls of said spool stem and said intermediate ring.

5. A fitting adapted for connection between two adjacent frames mechanically isolated from one another to allow independent vibration movement relative to each other and to allow a coolant fluid flow between said frames with essentially zero fluid reactive force, said fitting comprising:
a spool member having a means for securement to one of said frames, said spool member having an elongated stem with a central blind bore extending along an axis of said stem including a coolant fluid flow opening adapted to communicate with a fluid conduit in one of said frames;
a radial bore extending through a side wall of said stem at a central position along the length of the stem;
an intermediate ring having opposite side faces that lie in parallel planes that are perpendicular to the stem axis said ring being axially slidable along a length of said elongated stem from said blind bore end to said central stem portion and having a radial bore substantially in alignment with the radial side wall bore in said stem;
first and second bellow means connected between the opposite side faces of the intermediate ring and opposite ends of said spool member to form two chambers which are in fluid communication with each other and with the blind bore of said spool member;

said first and second bellow means having an outer diameter that is smaller than an outer diameter of said intermediate ring; and a housing having a means for securement to the other of said frames, said housing having means forming a coolant flow path to the other of said frames from an exterior surface of said intermediate ring including an inner cylindrical surface portion that has a diameter that is larger than the outer diameter of the bellow means which extends in a surrounding relationship of and is rigidly secured to said intermediate ring.

6. A fitting as defined in claim 5 wherein the openings communicating with said frames are in axial alignment with each other.

7. A fitting as defined in claim 6 wherein the housing has first and second parts, said first part includes a flange and a first skirt with said first skirt extending across the length of said intermediate ring and being sealingly secured to the end of the intermediate ring nearest said securement means including a spool flange, and said second part includes said housing fluid opening and a second skirt which is located radially inwardly of said first skirt and has a uniform diameter along a length ending at an end portion that is larger than the outer diameter of said bellow means, but surrounding one of said bellows means, and sealingly secured to the side face of the intermediate ring nearest to said housing flange.

8. The fitting as defined in claim 7 wherein the second housing part is sealingly secured to said first part along a path which is on an exterior surface of the housing and which surrounds the fluid opening, said second housing part has at least one slant hole which extends to a space between said first and second skirts.

9. The fitting as defined in claim 8 wherein said second housing part contains a vent opening to allow ambient air in space circumscribed by said second skirt.

10. The fitting as defined in claim 5 wherein the openings in said housing and spool each have an axis and the axes are substantially perpendicular to each other and wherein the housing fluid opening is in axial alignment with the radial bore in said intermediate ring.

11. The fitting as defined in claim 10 wherein the housing includes an outer ring shaped member having an inner diameter which is sealingly engaged with an outer surface of the intermediate ring, said outer ring shaped member having a radially disposed through hole axially aligned with the radial bore in said intermediate ring.

* * * * *